United States Patent [19]

Tanaka

[11] 3,937,778
[45] Feb. 10, 1976

[54] METHOD OF VACUUM-PRESSURE INJECTION MOULDING

[75] Inventor: Shoichi Tanaka, Shizuoka, Japan

[73] Assignee: Toshiba Kikai Kabushiki Kaisha, Tokyo, Japan

[22] Filed: Oct. 24, 1974

[21] Appl. No.: 517,799

[30] Foreign Application Priority Data
Oct. 27, 1973  Japan.............................. 48-120997

[52] U.S. Cl. ................. 264/102; 264/85; 264/328; 264/329
[51] Int. Cl.² .................... B29D 09/04; B29D 29/00
[58] Field of Search ........... 264/101, 102, 328, 329, 264/97, 85

[56] References Cited
UNITED STATES PATENTS

| | | | |
|---|---|---|---|
| 2,207,426 | 7/1940 | Bailey | 264/85 X |
| 3,177,272 | 4/1965 | Plymale | 264/102 |
| 3,253,303 | 5/1966 | Bradt | 264/102 X |
| 3,485,905 | 12/1969 | Compp | 264/102 X |
| 3,488,412 | 1/1970 | Bielfeldt | 264/329 X |
| 3,577,360 | 5/1971 | Immel | 264/101 X |
| 3,822,331 | 7/1974 | Cogliano | 264/101 X |

FOREIGN PATENTS OR APPLICATIONS

| | | | |
|---|---|---|---|
| 1,338,703 | 1963 | France | 264/329 |
| 1,357,270 | 1964 | France | 264/329 |

Primary Examiner—Richard R. Kucia
Attorney, Agent, or Firm—Spensley, Horn and Lubitz

[57] ABSTRACT

In a method for injection moulding of the type wherein gas or vapor evolved from the resin being moulded is vent through a vent opening provided for a heated cylinder at an intermediate point thereof, the vent opening is maintained at a reduced pressure during metering and a small quantity of vaporizable liquid is admitted into the vent opening during injection for increasing the pressure therein.

2 Claims, 5 Drawing Figures

METHOD OF VACUUM-PRESSURE INJECTION MOULDING

BACKGROUND OF THE INVENTION

This invention relates to a method for injection moulding.

Most raw materials utilized in an injection moulding machine or ejection moulding machine contain or evolve gas, air or moisture which are heated, evaporated and expanded while the raw materials are heated or melted in a heated cylinder of the moulding machine and such gas or vapor disperses and remains in the moulded articles as gas bubbles. To overcome this dificulty a so-called vent moulding machine is often used. In the ejection moulding machine a screw is continuously rotated in a heated cylinder so as to continuously eject the heated resin therein, whereas in the injection moulding machine, the rotation of the screw is intermittent so that while the screw is being stopped the resin stays in the heated cylinder and the volatile components and other gases expand. Since the pressure of the portion near the vent opening is reduced the resin will overflow through the vent opening thus causing vent up and closing of the vent opening. Accordingly, the vent effect is nullified. For this reason, in the injection moulding machine, while the screw is being stopped, the pressure of the portion near the vent opening is increased to or above the atmospheric pressure for preventing vent up.

Such a method is well known as disclosed in the specification of Japanese Pat. Publication No. 666 of 1971. This method will be described in the following with reference to FIGS. 1 and 2 of the accompanying drawings.

Thus, in an injection moulding machine, a valve 3 including a passage 2 is provided at a vent opening 1. The valve 3 is rotated for communicating the passage 2 with an inlet opening 5 or an exhaust opening 4. During rotation of screw 6 the valve 3 is maintained in the position shown in FIG. 1 so as to communicate the passage 2 with exhaust opening 4 which is connected to a vacuum pump (not shown) thus maintaining a reduced pressure in the vent opening 1. After completion of metering, rotation of screw 6 is stopped and the valve 3 is rotated to the position shown in FIG. 2 thus introducing to the vent opening 1 air under atmospheric pressure or pressurized inert gas through inlet opening 5 and passage 2, thus preventing vent up.

It should be understood that the rotation of valve 3 is effected by electric signals generated in synchronism with the start and stop of screw 6.

Such prior art method, however, has the following disadvantages.

1. When increasing the pressure at the vent opening to the atmospheric pressure or above the atmospheric pressure which has been maintained under a reduced pressure, it takes a certain time before the pressure at the vent opening increases unless inlet opening of large diameter is used. This means that the reduced pressure condition persists a relatively long period after stopping the screw 6, thus causing vent up. Readily oxidizable material such as nylon will be colored or degraded by contact with air. Where the diameter of the bent opening is increased, it is necessary to use a large and expensive valve.

2. Where pressure is applied to the vent opening 1 by air or inert gas, although it is possible to prevent bent up, oxidation of the material is accelerated when pressurized air is used. Where pressurized inert gas is used, while oxidation of the raw material and vent up can be efficiently precluded, inert gas is generally more expensive than air and in addition supplement and maintainance of such gas must be made with care. Accordingly, use of inert gas is not advantageous for small factories.

The time required for the gas pressure to increase to or above the atmospheric pressure can be decreased by switching the valve to the atmosphere side before the screw is stopped, but this decreases the interval in which the reduced pressure is maintained at the vent opening thus decreasing the effect thereof.

SUMMARY OF THE INVENTION

It is an object of this invention to provide an improved method for injection moulding capable of eliminating various defects described above.

Another object of this invention is to provide an injection moulding machine capable of efficiently venting gas or vapor evolved by the material being moulded and preventing vent up or overflow of the material while the screw of the machine is stopped.

Still another object of this invention is to provide a novel method for injection moulding which use vaporizable liquid for increasing the pressure in the vent opening during injection that will not be entrained in the raw material or moulded articles.

According to one aspect of this invention there is provided a method of injection moulding of the type utilizing an injection moulding machine including a heated cylinder having a vent opening at an intermediate point between the opposite ends thereof and a screw rotatably contained in the cylinder and wherein the screw is rotated during metering but stopped during injection, characterized by the steps of maintaining a reduced pressure in the vent opening during the rotation of the screw, and introducing into the vent opening a predetermined quantity of vaporizable liquid at the time when the rotation of the screw is stopped thus causing the liquid to evaporate to increase the pressure in the vent opening.

According to another aspect of this invention there is provided an injection moulding machine of the type comprising a heated cylinder having a vent opening at an intermediate point between the ends thereof, and a screw rotatably contained in the cylinder, the screw being rotated during metering but stopped during injection, characterized in that there are provided an evacuation system, a valve connected between the vent opening and the evacuation system, means for opening the valve during metering, a source of vaporizable liquid and valve means for supplying a predetermined quantity of the liquid into the vent opening when the rotation of the screw is stopped.

DESCRIPTION OF THE PREFERRED EMBODIMENTS

Figure 1:
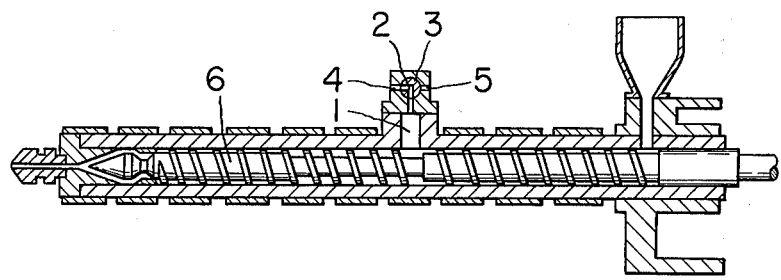
FIG. 1 shows a longitudinal sectional view of a prior art injection moulding machine with a vent opening.
Figure 2:
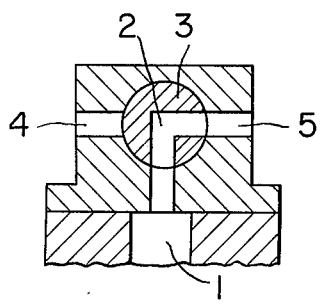
FIG. 2 is an enlarged sectional view showing a vent opening and a valve utilized in the machine shown in FIG. 1.
Figure 3:
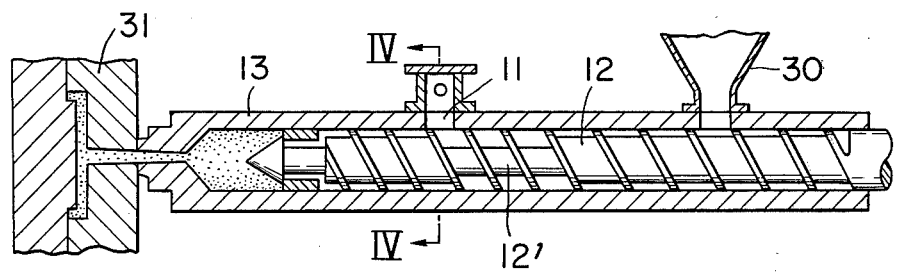
FIG. 3 is a longitudinal sectional view of an injection moulding machine embodying the invention.
Figure 4:
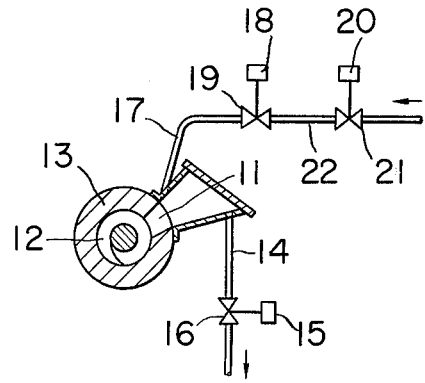
FIG. 4 shows a cross-section of the machine shown in FIG. 3 taken along a line IV—IV.

An injection moulding machine embodying the invention and shown in FIGS. 3 and 4 comprises a heated cylinder 13 which may be heated by an electric heater, not shown, a screw 12 contained therein and a vent opening 11 provided at an intermediate point of the cylinder. The diameter of a portion 12' of screw 12 corresponding to the vent opening 11 is reduced for facilitating escape of gas or vapor through the vent opening 11. The raw material, such as a powder of plastic, is supplied through a hopper 30 and conveyed to the left by the screw 12. While being conveyed by the screw, the raw material is heated and becomes plastic. The material is then injection moulded into a metal mould 31 in a manner well known in the art.

An exhaust pipe 14 is connected to the vent opening 11 through a valve 16 operated by a solenoid coil 15. Although not shown in the drawing, the lower end of the exhaust pipe 14 is connected to a suitable exhausting device, a vacuum pump for example. Liquid, for example water, is supplied to the vent opening through a supply pipe 17 including two serially arranged valves 19 and 21, respectively operated by solenoid coils 18 and 20. With this arrangement it is possible to store a predetermined quantity of the liquid in a pipe section 22 between valves 19 and 21.

In operation, during metering, that is during a predetermined number of revolutions of the screw 12, valves 19 and 21 are closed to store the predetermined quantity of the liquid in the pipe section 22. During this period valve 16 in the exhaust pipe 14 is held open to exhaust gas or vapor evolved from the raw material. When metering is completed the screw is stopped and exhaust valve 16 is closed by an electric signal supplied to the solenoid coil 15. The electric signal is also applied to solenoid coil 18 to open valve 19. Accordingly, the liquid which has been stored in section 22 is supplied to the vent opening 11 as a fine stream or spray. The liquid thus supplied immediately vaporizes to immediately increase the pressure in the vent opening 11 from a sub-atmospheric pressure. At the same time, the surface of the raw material immediately below the vent opening is cooled by the liquid to form a thin film which is effective to prevent vent up. Electric signals are applied such that when the screw 12 is restarted valve 19 is closed whereas valves 16 and 21 are opened. Then the vent opening 11 is evacuated and section 22 is filled with the liquid. A predetermined time later valve 21 is closed to store the predetermined quantity of the liquid in section 22.

Figure 5:
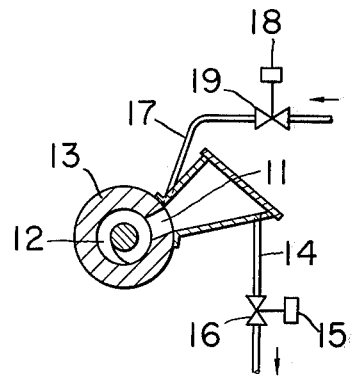
FIG. 5 is a sectional view showing a modified embodiment of this invention.

In a modified embodiment shown in FIG. 5, valve 21 is omitted and the valve 19 is opened for a predetermined interval by a timer, not shown, after the screw has stopped, thereby supplying a predetermined quantity of the vaporizable liquid into the vent opening.

The quantity of the liquid supplied into the vent opening is relatively small and it is advantageous to supply the liquid only to the opening of vent opening commucating the same with heated cylinder and to the portion of the screw near the vent opening. The invention has the following advantages.

1. The surface temperature of the raw material is decreased locally to prevent foaming due to evaporation of vaporizable components.

2. The temperature of the raw material and the portion of the cylinder near the vent opening is decreased to prevent adhesion or seizure of the raw material to the wall surface of the vent opening.

3. When water is used, it is possible to use it readily like air. Further, water can prevent oxidation of the raw material caused by air.

4. Since the quantity of the vaporizable liquid is small, it rapidly vaporizes as soon as it is supplied. Thus, there is no fear of the entrainment of the liquid in the molten raw material. Accordingly, the moulded articles do not contain any liquid.

In addition, water is cheaper and can be maintained with less trouble than inert gases. Although water has been used as the vaporizable liquid any other vaporizable liquids, particularly those inactive to resin, such as ethyl alcohol, can be used.

What is claimed is:

1. In a method of injection moulding of the type utilizing an injection moulding machine including a heated cylinder having a vent opening at an intermediate point between the opposite ends thereof and a screw rotatably contained in the cylinder and wherein the screw is rotated during metering but stopped during injection, the improvement which comprises the steps of maintaining a reduced pressure in said vent opening during the rotation of said screw, and introducing into said vent opening a predetermined quantity of vaporizable liquid at the same time when the rotation of said screw is stopped thus causing said liquid to evaporate to increase the pressure in said vent opening.

2. The method according to claim 1 wherein said vaporizable liquid is supplied into said vent opening as a fine stream or spray.

* * * * *